Jan. 23, 1945.  V. H. HASSELQUIST ET AL  2,367,772
BUILDING FORM
Filed July 21, 1942
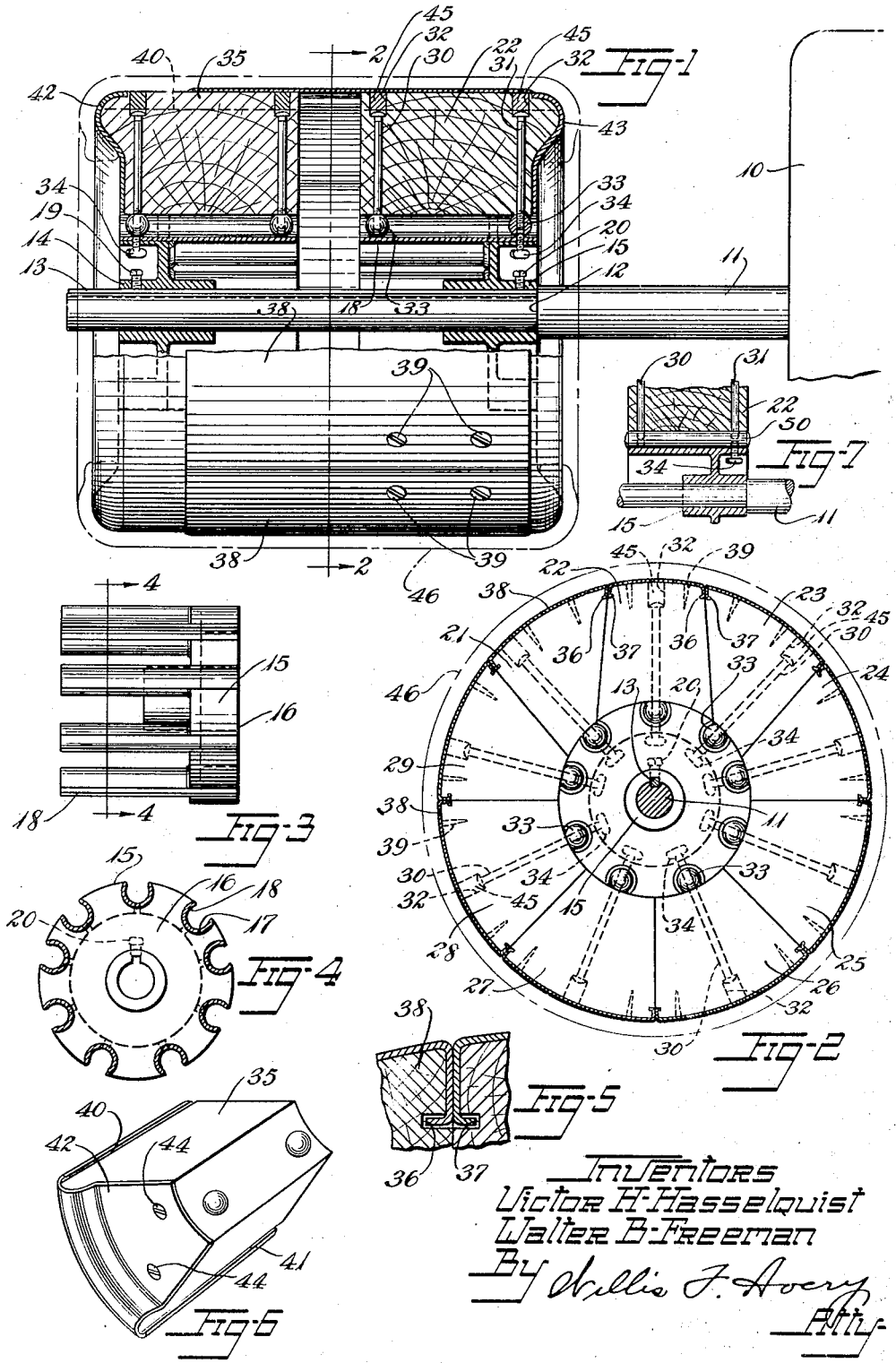
Inventors
Victor H. Hasselquist
Walter B. Freeman
By Willis F. Avery
Atty.

Patented Jan. 23, 1945

2,367,772

UNITED STATES PATENT OFFICE 2,367,772

BUILDING FORM

Victor H. Hasselquist, Akron, and Walter B. Freeman, Cuyahoga Falls, Ohio, assignors to The B. F. Goodrich Company, New York, N. Y., a corporation of New York Application July 21, 1942, Serial No. 451,696

5 Claims. (Cl. 154—9)

This invention relates to building forms and especially to tire building forms for use in the manufacture of tires by the band method, and is especially useful in apparatus for building tires having a small bead diameter.

In the manufacture of tires by the band method the tire building material, such as rubberized cord material, in sheet form has been assembled about a rotatable drum former, incorporating in the margins of the material inextensible annular bead cores, and thereafter the rubber-like material for the tread and sidewalls has been wound thereabout and rolled in place. During the building operation, the drum has been rotated while various forming tools have been applied to roll and spin the material into proper place. It has then been necessary to remove the band so formed from the drum former whose outer diameter was greater than that of the bead portions of the band.

It has been found desirable to build bands of different widths and of the same diameter, making it desirable to provide drums conveniently adjustable to width as well as capable of disassembly piece by piece for removal through the bead portions of small diameter.

The present invention aims to satisfy fully these requirements and to overcome difficulties and inconveniences existing in drum-building practice heretofore.

The principal objects of the invention are to provide ease of adjustability, facility of assembly and disassembly, and simplicity of construction. These and other objects will appear from the following description and the accompanying drawing.

Of the drawing,

Fig. 1 is an elevation, partly broken away and partly in section, of a building or forming drum constructed in accordance with and embodying the invention, the position of the tire band when built thereon being indicated by broken lines.

Fig. 2 is a sectional view, taken on line 2—2 of Fig. 1, the position of the tire band when built thereon being indicated by broken lines.

Fig. 3 is a view in elevation of one of the hub members.

Fig. 4 is a sectional view, taken on line 4—4 of Fig. 3.

Fig. 5 is a detail sectional view showing the construction of the drum segments, parts being broken away.

Fig. 6 is a perspective view of one of the drum segments.

Fig. 7 is a detail sectional view showing a modification of the sliding gib and channel connection, parts being broken away.

In the illustrative embodiment of the invention shown in the drawing a pair of hub members are adjustably mounted along a driving shaft and are each formed with axially disposed peripheral key slots for receiving and retaining a plurality of drum segments. One set of drum segments have individual surface extensions adapted to engage slidably over axially adjacent similar segments of the other set for bridging the space therebetween, and the axially adjacent segments are separately removable from the tire band.

Referring to the drawing, the numeral 10 designates the drive of a tire building machine, from which projects a horizontal rotatable shaft 11. The outer end of the shaft is reduced outwardly from a shoulder 12 and is provided with a feather key 13. Slidably mounted on the reduced end of the shaft are a pair of similar segment-supporting hubs 14, 15. Each hub, of which hub 15 is illustrated in Figs. 3 and 4, comprises a disc portion 16 formed with peripheral axially extending slots 17 in which axially extending guide members 18 are secured. The guide members are in the form of channels having outwardly facing open converging sides, preferably formed, for light-weight in construction, of metal tubing and secured to the disc as by welding. The hubs are formed with keyways to fit the feather key 13 and are provided with set screws 19, 20 for locking the hubs to shaft 11 in any desired position of adjustment.

Removably mounted about the hub 15 are a set of segments 21, 22, 23, 24, 25, 26, 27, 28, 29, preferably, for lightness, formed of wood. These blocks are each of such dimensions as to be separately removable through the rim opening of the tire band without distortion of the tire band. One of the segments 22 of each set is wider at its base than at its radially remote end so that it may be removed in advance of the others. Each segment is removably secured to the hub by a pair of bolts 30, 31 extending radially therethrough with the head of each bolt engaging in a countersink 32 of the block and its threaded end engaging a gib in the form of a spherical nut 33 fitting the channel groove of the guide member 18. The arrangement is such that with the spherical nuts drawn up, the nuts have sliding engagement with the channel for moving the segments axially, and the segments may be locked against axial movement by thumb screws 34 threaded through the guide members 18 in position to enter the threaded openings in the spherical nuts, the threads of which they clear.

In the modified form of gib shown in Fig. 7, a cylindrical bar 50 of metal is slidably fitted in the channel groove and is tapped at a plurality of positions to receive the threaded ends of the bolts 30, 31.

A similar set of segments 35 is similarly mounted on hub 14 for axial adjustment and are also removable through the rim opening of the tire band.

To provide for building bands of the same diameter but of different widths the segments are axially grooved as at 36, 37 on their meeting faces. Sheet metal bridge members 38 are fixed to segments 21 to 29 so as to overlie the peripheral faces thereof with their axially extending margins turned inwardly along their meeting faces and into grooves 36, 37. At one end the bridge members are secured to the segments, as by screws 39, while their opposite ends extend beyond the segments and over the opposite similar segments on hub 14, the inturned margins engaging slidably in slots 40, 41 of the opposite segment 35. The arrangement is such that the hubs 14, 15 may be adjusted to difficult distances apart and the segments move with them while the bridge members bridge the space between segments and provide a strong working surface by reason of their flanged inwardly turned margins.

To provide a good wear-resisting working face, sheet metal reinforcing plates 42, 43 are secured over the shoulders and radial faces of each segment, as by screws 44, and the countersunk openings 32 are filled by plugs 45.

In the use of the drum, the segment blocks are assembled on the hubs 14, 15 and the thumb screws 34 tightened to fix them in place. The hubs 14, 15 are then adjusted to provide a drum of the desired width and set screw 19 is tightened to maintain the adjustment. After a tire band has been built about the drum as indicated by the broken lines 46, the thumb screws 34 are backed away from the openings in the spherical nuts 33. The tire band with the segments therein may then be moved axially of the shaft 11 as the channel grooves of hubs 14 and 15 are in alignment and the spherical nuts will slide therealong. The two sets of segments may then be moved toward each other to clear the underhanging bead portions of the tire band and the segments then removed in pairs of axially adjacent segments, the key segments like segment 22 being removed first. After removal of the tire band the segments are reassembled on hubs 14, 15.

The segments may be made of wood or other light-weight material and may be turned to shape and size. The metal facings may then be applied to prevent excessive wear. The apparatus is quickly adjustable to different widths of tire bands and different sets of segmental blocks may be used on one pair of hubs.

Variations may be made without departing from the scope of the invention as it is defined by the following claims.

We claim:

1. A tire-building form comprising a pair of hubs each independently adjustable axially along a shaft toward and from each other and adapted to be secured thereto in a position of adjustment, said hubs having axially extending engaging means at their peripheries in alignment with each other, a set of segmental blocks removably mounted by said engaging means about one hub to provide a work-supporting surface, a set of segmental blocks removably mounted by said engaging means about the other hub, and extension plates on blocks of one set and adapted to overlie axially adjacent blocks of the other set to bridge the space therebetween and provide a work-supporting surface.

2. A tire-building form comprising a pair of hubs each independently adjustable axially along a shaft toward and from each other and adapted to be secured thereto in a position of adjustment, said hubs having axially extending engaging means at their peripheries in alignment with each other, a set of segmental blocks removably secured by said engaging means about one hub to provide a work-supporting surface, a set of segmental blocks removably secured by said engaging means about the other hub, and extension plates on blocks of one set and adapted to extend over the axially adjacent blocks of the other set to bridge the space therebetween and provide a continuous work-supporting surface, said plates having means for slidably engaging the blocks of said other set to lock said blocks against relative circumferential movement.

3. Tire building apparatus comprising a shaft having key means therealong, a pair of hubs each independently adjustable axially along said shaft toward and from each other and adapted to be secured thereto in a position of adjustment, said hubs having axially disposed guide means at their peripheries in alignment with each other, a set of segmental blocks removably secured in said guide means about one hub to provide a work-supporting surface, means for locking said blocks to said guide means, a similar set of segmental blocks removably secured in the guide means of the other hub, means for locking said last-named set of blocks to said other hub, said blocks being adapted to slide axially across the peripheries of both hubs for removal therefrom, and each block of one set having an extension plate fixed thereto and adapted to extend over a block of the other set to bridge the space therebetween and provide a continuous work-supporting surface.

4. A building form comprising a pair of hub structures adapted for adjustment with relation to each other along a shaft, respective segmental structures upon said hub structures, a series of axially extending tubes interposed between said hub and segmental structures, said tubes having axially-extending slots therein and headed elements slidable in said tubes for holding said segmental structures radially on said hub structures.

5. A building form comprising a plurality of segments and a plate element upon the periphery of each segment, each plate element having inwardly turned and axially extending margins and the segment having grooves receiving said margins in a manner permitting relative axial movement of the plate and segment while preventing radial separation of the plate and segment.

VICTOR H. HASSELQUIST.
WALTER B. FREEMAN.